United States Patent
Yajima (10) Patent No.: US 7,382,936 B2
(45) Date of Patent: Jun. 3, 2008

(54) SURVEILLANCE CAMERA APPARATUS HAVING A SELECTING OPERATION OF IMAGE INFORMATION IN A RECEIVING SIDE

(75) Inventor: Kaneo Yajima, Tachikawa (JP)

(73) Assignee: Hitachi Kousai Electric Inc., Tokyo (JP)

( * ) Notice: Subject to any disclaimer, the term of this patent is extended or adjusted under 35 U.S.C. 154(b) by 820 days.

(21) Appl. No.: 10/642,595

(22) Filed: Aug. 19, 2003

(65) Prior Publication Data

US 2004/0036767 A1 Feb. 26, 2004

(30) Foreign Application Priority Data

Aug. 22, 2002 (JP) .............................. 2002-241521

(51) Int. Cl.
- G06K 9/20 (2006.01)
- G06K 9/36 (2006.01)
- G06K 9/40 (2006.01)
- G06K 9/00 (2006.01)
- H04N 7/18 (2006.01)
- H04N 9/47 (2006.01)
- H04N 5/255 (2006.01)

(52) U.S. Cl. ...................... 382/283; 382/103; 382/261; 348/143; 348/169

(58) Field of Classification Search ................ 382/261, 382/100, 103, 282, 283; 348/143, 169
See application file for complete search history.

(56) References Cited

U.S. PATENT DOCUMENTS 5,745,166 A * 4/1998 Rhodes et al. .............. 348/143
6,744,461 B1 * 6/2004 Wada et al. ................ 348/143

FOREIGN PATENT DOCUMENTS

JP 2001069494 3/2001

* cited by examiner

Primary Examiner—Matthew C. Bella
Assistant Examiner—Wes Tucker
(74) Attorney, Agent, or Firm—Mattingly, Stanger, Malur & Brundidge, P.C.

(57) ABSTRACT

A surveillance camera apparatus which has an image signal transmission apparatus transmitting an image signal and an image signal reception apparatus receiving an image signal from the image signal transmission apparatus. The image signal transmission apparatus has an image pick-up unit for picking-up an object, a position input unit for specifying a predetermined range, and an image signal output unit for outputting position information obtained from the position input unit superimposed on an image signal obtained from the image pick-up unit. The image signal reception apparatus has a detector for detecting position information from an image signal to which the position information is added, a recorder for recording the image signal, and a controller for selecting any one of the image signal and a signal masking a predetermined range of the image signal based on the position information from the detector for position information and for recording it into the recorder.

9 Claims, 6 Drawing Sheets

SURVEILLANCE CAMERA APPARATUS HAVING A SELECTING OPERATION OF IMAGE INFORMATION IN A RECEIVING SIDE

BACKGROUND OF THE INVENTION

The present invention relates to a surveillance camera apparatus. More specifically, the present invention relates to a surveillance camera apparatus which monitors all images obtained by an imaging unit, selectively masks the area of part of an image for the purpose of image picking-up forbiddance and privacy protection, and prevents it from being recorded or outputted.

A large number of surveillance apparatuses using an imaging unit are used for surveillance of an intruder or an intruding object (hereinafter, called an intruding object) into a Keep Out area of a public building and location, a bank, a store such as a supermarket, a dam, a base station, and an airport. When such surveillance apparatus is installed for surveillance of a public location, a neighboring house or a location causing a privacy problem is within the field of view of the surveillance apparatus and may often be image picked-up together in the range for surveillance. This can be the cause of a complaint.

To prevent a neighboring house or a location causing a privacy problem from being displayed on the image screen of a surveillance apparatus for the purpose of privacy protection, there is proposed a method for performing processing of limiting an image picking-up direction or removing, from the image screen, an object which must not be image picked-up, e.g., the periphery of a neighboring house, by image processing. The method will be described below in detail using FIG. 7.

Figure 7:
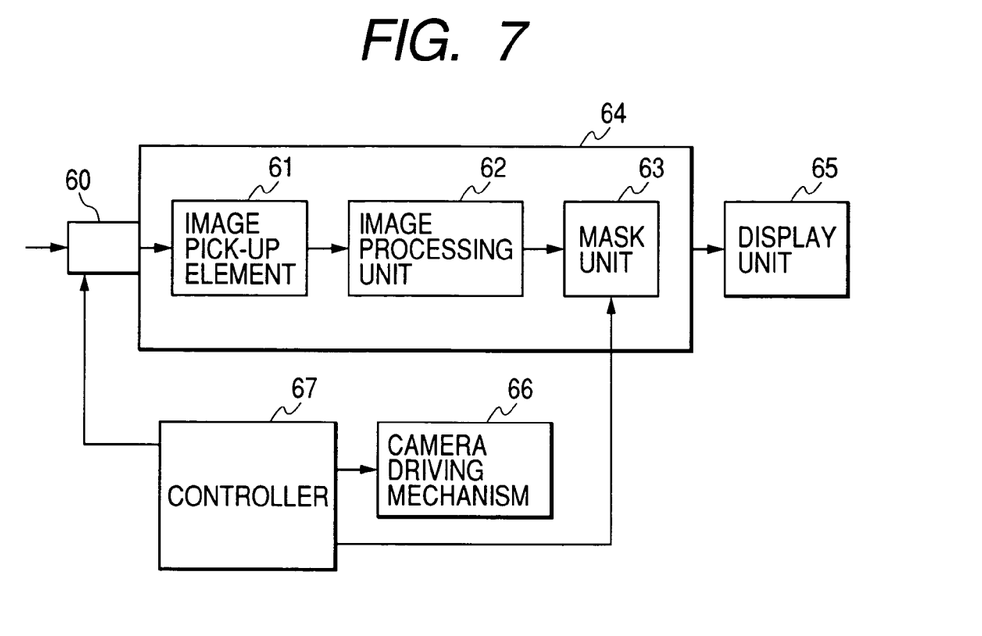
FIG. 7 is a block diagram showing the schematic construction of a prior art surveillance camera imaging apparatus.

FIG. 7 shows a schematic construction diagram of a prior art surveillance camera imaging apparatus. In FIG. 7, the numeral 60 denotes a lens unit, and the numeral 61 denotes an image pick-up element such as a CCD (charge coupled device). An incident light from the field of view of imaging is incident via the lens unit 60 upon the image pick-up element 61. The image pick-up element 61 converts the incident light subjected to adjustment of the angle of view by the lens unit 60 to an image signal, which then inputs it to an image processing unit 62. The image processing unit 62 subjects the inputted image signal to image processing such as white balance adjustment and gamma correction. The image signal subjected to the image processing is inputted to a mask unit 63. The mask unit 63 has a function of masking part of an image privacy-protected in the field of view of imaging incident via the lens 60. The image signal masked by the mask unit 63 is displayed as a surveillance image on a display unit 65. The numeral 64 denotes a camera unit and has the image pick-up element 61, the image processing unit 62, and the mask unit 63.

A controller 67 has a function of setting the control of the pan direction and the tilt direction of the camera unit 64, the zoom of the lens unit 60 and the mask range of the mask unit 63. The camera unit 64 is attached to a pan head, not shown, for freely moving it in the pan direction and the tilt direction. The pan head is driven by a camera driving mechanism 66 in which the pan and tilt directions are controlled by the controller 67.

Figure 8:
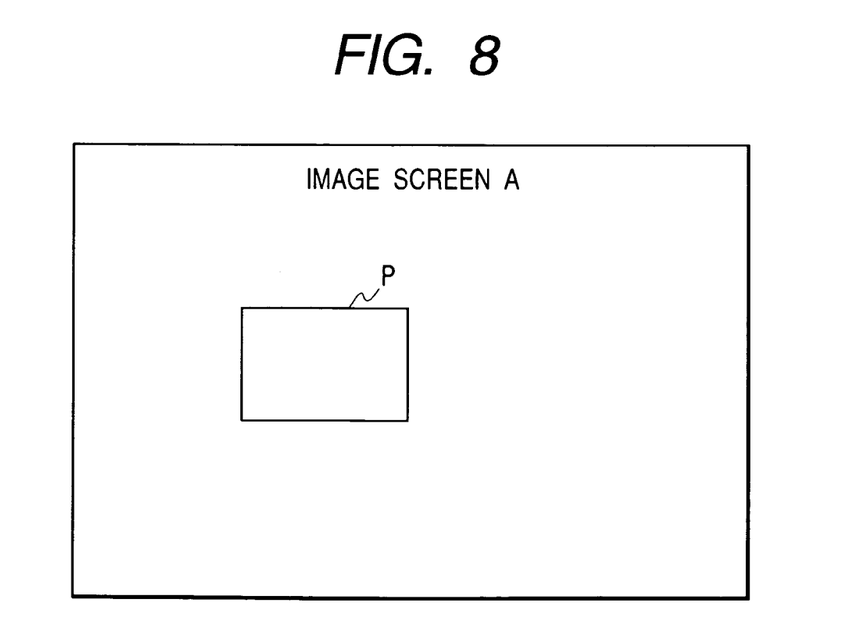
FIG. 8 is a diagram showing the range of privacy-related information picking-up by a camera.

Assume that the controller 67 controls the camera driving mechanism 66 of the pan head to adjust the direction of the field of view of the camera unit 64, and controls zooming of the lens unit 60, wherein an image screen A shown in FIG. 8 is picked-up by the camera unit 64. The case that the image screen A has privacy-related information will be described below. In FIG. 8, the range indicated by P shows a range of privacy-related information. In this example, the image screen A is incident via the lens unit 60 upon the image pick-up element 61.

In the case of picking-up the intruding object for surveillance, a privacy part must be masked in the camera for privacy protection to output an image of the object. An incident light in the range P of the privacy-related information must be blocked on the image screen A of FIG. 8. To mask this part, the controller 67 controlling the mask unit 63 applies a necessary control signal to the mask unit 63. The part of the range P of the privacy-related information is masked, for example, the image signal of this part is removed for display on the display unit 65 without displaying the privacy-related information.

In the above prior art surveillance camera apparatus, the privacy-related information has already been subjected to processing such as removing in the camera unit 64 to be a masking image. When the image signal outputted from the camera unit 64 is transmitted via a network, is displayed on the monitor or is recorded, the privacy-related information has already been erased. A side receiving transmission of the image cannot obtain a detailed image of its part. In criminal investigation, it may be desired that even privacy-related information be obtained by limiting its application. The side receiving transmission of the image cannot select the image.

SUMMARY OF THE INVENTION

An object of the present invention is to provide a surveillance camera apparatus in which a side receiving transmission of privacy-related image information can select the image information.

Another object of the present invention is to provide a surveillance camera apparatus which can easily select privacy-related image information.

A further object of the present invention is to provide a surveillance camera apparatus which can be used as various surveillance cameras by selecting a mode.

To achieve the above objects, a surveillance camera apparatus of the present invention which has an image signal transmission apparatus for transmitting an image signal and an image signal reception apparatus for receiving an image signal from the image signal transmission apparatus, wherein the image signal transmission apparatus comprises an image pick-up unit for picking-up an object; a position input unit for specifying a predetermined range from an output signal from the image pick-up unit; and an image signal output unit for outputting position information obtained from the position input unit superimposed on the image signal obtained from the image pick-up unit, and the image signal reception apparatus has a position information detector for detecting position information from an image signal to which the position information transmitted from the image signal transmission apparatus is added; a recorder for recording the image signal; and a controller for selecting any one of the image signal and a signal masking a predetermined range of the image signal based on said position information from the position information detector, and for recording it into the recorder.

In a surveillance camera apparatus of the present invention, position information obtained from the position input unit is superimposed on a vertical blanking period of the image signal obtained from the imaging unit.

In a surveillance camera apparatus of the present invention, the image signal reception apparatus further has a mode selector, and the controller selects at least any one of a mode recording into the recorder without masking and a mode recording into the recorder with masking based on a selection signal from the mode selector.

In a surveillance camera apparatus of the present invention, the controller further has a security setting unit, and the mode recording into the recorder without masking is set by the control of the security setting unit.

In a surveillance camera apparatus of the present invention, the image signal reception apparatus further has a memory unit for position information for storing position information from the detector for position information, a first selector for selectively outputting any one of the image signal and an image signal masking a predetermined part from the image signal based on the position information, and a second selector for recording an image signal selected by the selector into the recorder to selectively output any one of an output image signal from the recorder and an image signal masking a predetermined part from the output image signal based on the position information.

An image signal transmission apparatus of the present invention has: an image pick-up unit for picking-up an object; a position input unit for specifying an image picking up forbiddance range from an output signal from the image pick-up unit; a position information adding unit for superimposing position information obtained from the position input unit on an image signal obtained from the image pick-up unit; and an image signal output unit for outputting an image signal to which the position information is added.

In an image signal transmission apparatus of the present invention, position information obtained from the position input unit is superimposed on a vertical blanking period of an image signal obtained from the image pick-up unit to be outputted.

An image signal reception apparatus of the present invention has: an image signal input unit for inputting an image signal to which position information in an image pick-up forbiddance range is added; a position information detector for detecting position information from the image signal; a recorder recording the image signal; and a controller for any one of the image signal and a signal masking an image picking-up forbiddance range of the image signal based on position information from the position information detector to record it into the recorder.

An image signal reception apparatus of the present invention further has a mode selector, and the controller selects at least any one of a mode recording into the recorder without masking and a mode recording into the recorder with masking based on a selection signal from the mode selector.

In an image signal reception apparatus of the present invention, the controller further has a security setting unit, and the mode recording into the recorder without masking is set by the control of the security setting unit.

An image signal reception apparatus of the present invention has: a memory unit for position information storing position information from the detector for position information; a first selector for selectively outputting any one of the image signal and an image signal masking a predetermined part from the image signal based on the position information; and a second selector for recording an image signal selected by the selector into the recorder to selectively output any one of an output image signal from the recorder and an image signal masking a predetermined part from the output image signal based on the position information.

The above and other objects, features and advantages of the present invention will be apparent from the following detailed description of illustrative embodiments which is to be read in connection with the accompanying drawings.

DETAILED DESCRIPTION OF THE ILLUSTRATED EMBODIMENTS

Figure 1:
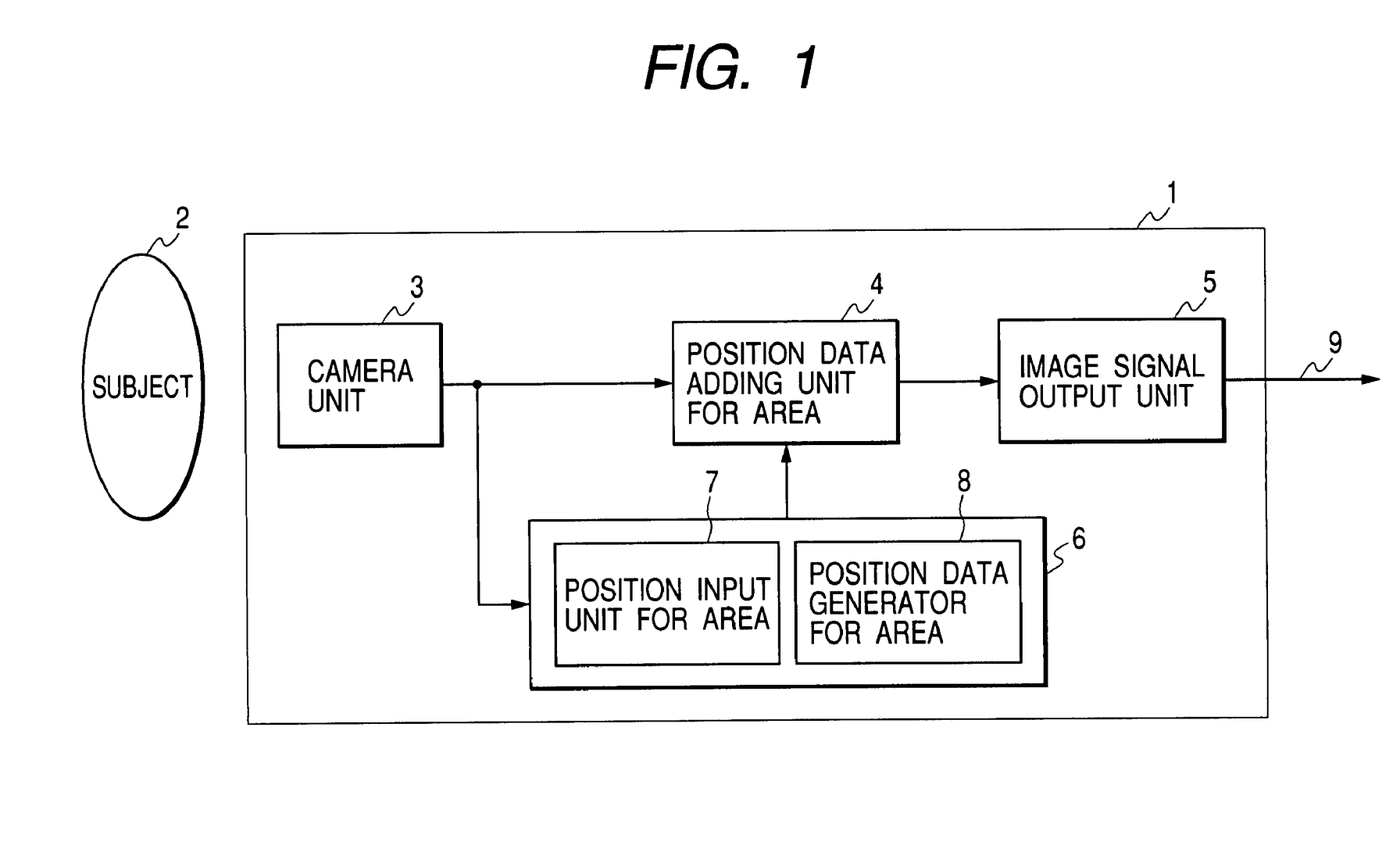
FIG. 1 is a block diagram showing an image signal transmission apparatus of an embodiment according to the present invention.

FIG. 1 shows a block diagram showing an embodiment according to the present invention. The numeral 1 denotes an image signal transmission apparatus which picks-up an object 2 by a camera unit 3. An image signal from the camera unit 3 which has picked-up the object 2 is applied to a position data adding unit 4 for area and a position information generator 6 for area, respectively. The position data adding unit 4 for area converts it to an image signal to which position information of a privacy-related image part is added. The detail of the position data adding unit 4 for area will be described later. The image signal from the position data adding unit 4 for area is subjected to signal processing for transmission by an image signal output unit 5, and is then transmitted via a transmission path 9 to a reception apparatus.

Figure 3:
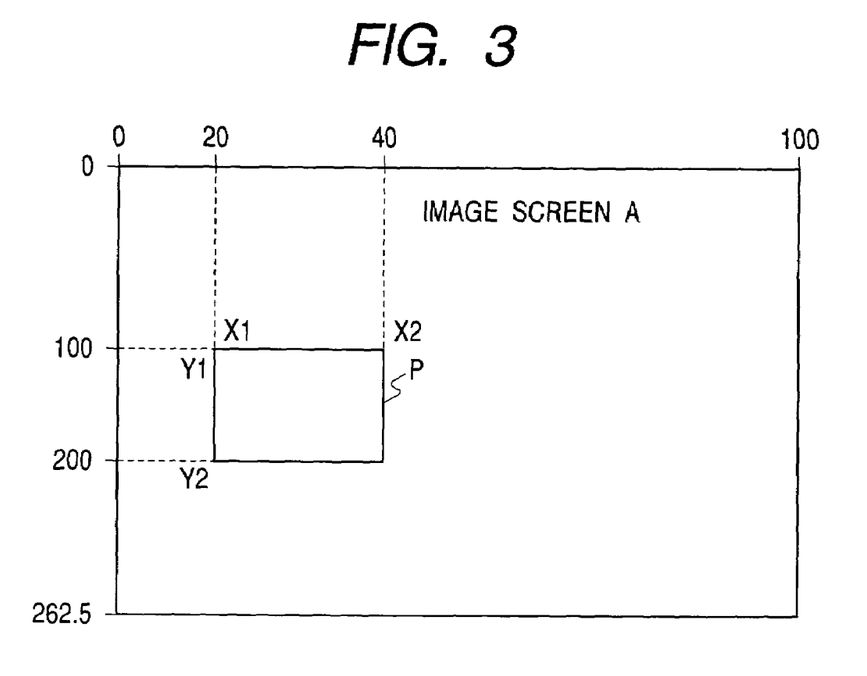
FIG. 3 is a diagram of assistance in explaining an embodiment of a privacy-related image range according to the present invention.

The position information generator 6 for area has a position input unit 7 for area and a position data generator 8 for area. As the position input 7 unit for area, an input unit, which has been known, such as a touch panel, can be used. The image signal from the camera unit 3 displays an image of the object 2 (or called subject) on the position input unit 7 for area such as a touch panel. FIG. 3 shows its state.

In FIG. 3, the position input unit 7 for area displays the entire display image screen and can input position information on the image screen. In the case of the NTSC television system having 525 scanning lines, two fields forms one image screen. As information of one field, the horizontal axis is divided into 100 points and the vertical axis is divided into 262.5 points, thereby inputting position information. When privacy-related image part P shown in FIG. 3 is inputted on a touch panel, (X1, X2) (Y1, Y2) are inputted as (20, 40) (100, 200). In this embodiment, for simplification, the privacy-related image part P is displayed in a rectangle. Generally, it is formed so as to identify a part touched at 3 points or more as area information.

Figure 5:
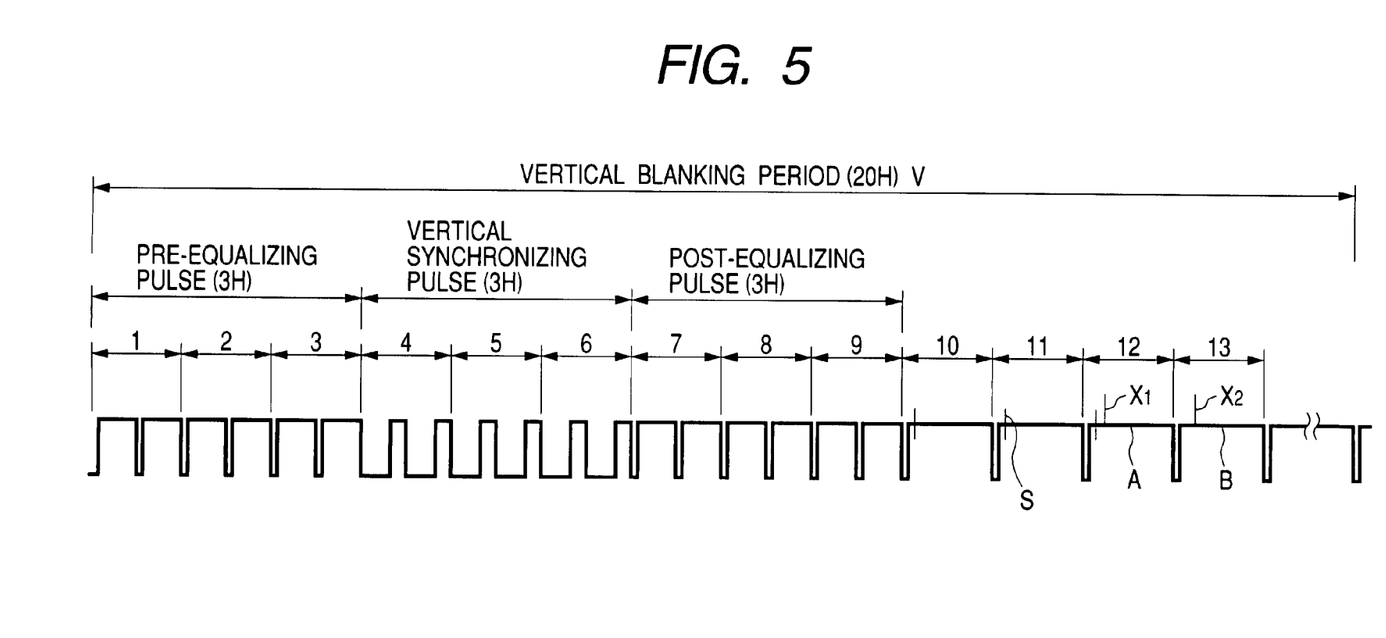
FIG. 5 is a diagram of assistance in explaining a vertical blanking period on which position information is superimposed according to the present invention.

When the position input unit 7 for area inputs (X1, X2) (Y1, Y2) as position information, as described above, the position data generator 8 for area generates position data for area added to the image signal. The operation of the position data adding unit 4 for area and the position data generator 8 for area will be described here using FIGS. 5 and 6. FIG. 5 is a diagram showing vertical blanking period V (20H) of image signals. The image signals are omitted for display. Here, H indicates one horizontal scanning period.

In FIG. 5, the vertical blanking period V has the first to the 20th scanning lines and has a pre-equalizing pulse (3H), a vertical synchronizing pulse (3H), a post-equalizing pulse (3H), and other pulses. The 10th to the 20th scanning lines are generally periods which can be freely used in a user side. Actually, they are used for superimposing a signal of time code information of a VTR and copy prohibition information of VTR software. The present invention shows an example in which the 12th and 13th scanning line periods of the vertical blanking period V are used to transmit position information (X1, X2) of the privacy-related image part P, and the 14th and 15th scanning line periods are used to transmit position information (Y1, Y2) of the privacy-related image part P. FIG. 5 shows signals obtained by synthesizing the position information X1 and X2 with periods A and B, respectively. S indicates a burst signal.

Figure 6:
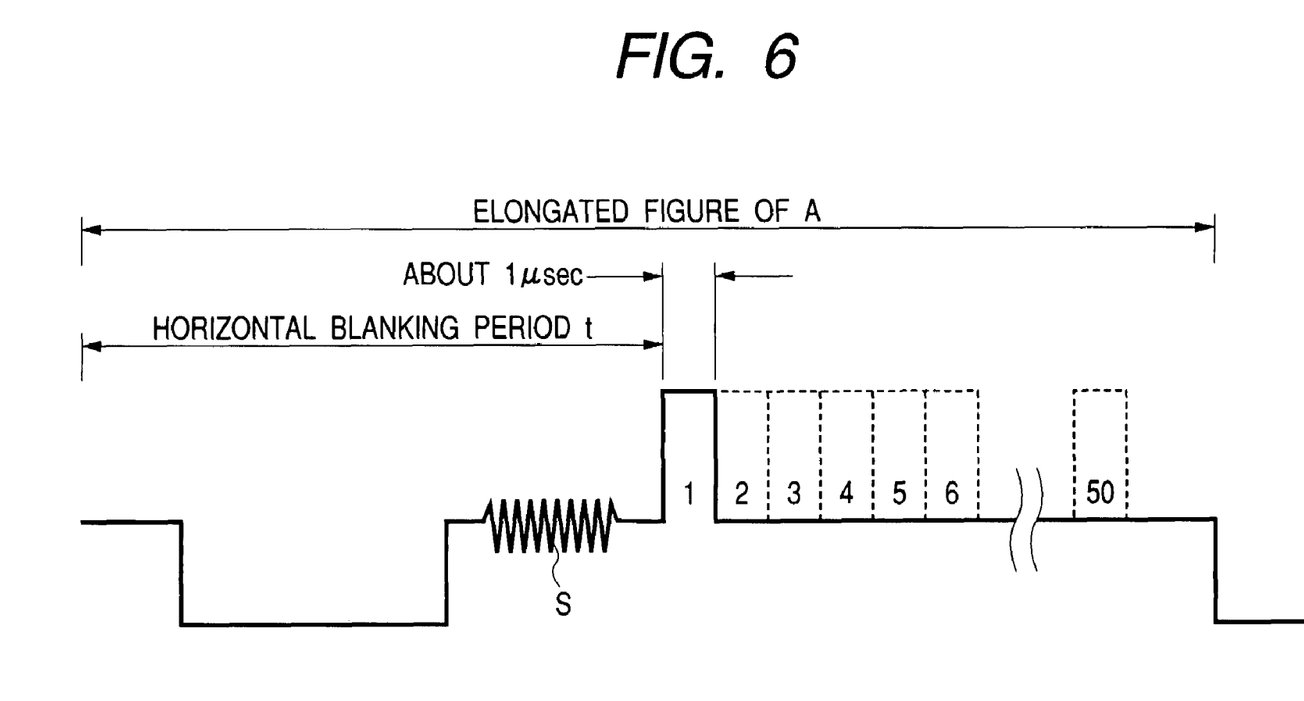
FIG. 6 is an elongated diagram of assistance in explaining the vertical blanking period on which position information is superimposed according to the present invention.

FIG. 6 shows an elongated figure of the period A shown in FIG. 5. In FIG. 6, a period continued from horizontal blanking time t is divided into 50 every 1 μs, and the position information X1 in the X axis direction is superimposed thereon. A signal resulting from the coding of the position information X1 in the X axis direction in the position data generator 8 for area is inputted to the position data adding unit 4 for area. The position data adding unit 4 for area superimposes the position information of the X1 position of the privacy-related image part P on the image signal from the camera unit 3. There are various methods for coding and superimposing the position information. To express (X1: 20) of FIG. 3, when 20 is subjected to binarization to be 10100 and the first of FIG. 6 is a least significant bit, pulse "1" is superimposed on the third and the fifth and others are "0" to express 20. To express (X2: 40) thereof, 40 is subjected to binarization to be 101000. Pulse "1" is superimposed on the fourth and the sixth and others are "0" to express 40. In the same manner, the position information (Y1, Y2) of the Y position of the privacy-related image part P, a pulse is superimposed on the horizontal blanking periods of the 14th and 15th, not shown, of the vertical blanking period. The display method by binarization is described here. Needless to say, this is not limited.

As described above, the image signal resulting from the addition of the position information of the privacy-related image part P to the image picked-up by the camera unit 3 is converted to a signal form suitable for transmission by the image signal output unit 5 and is then outputted as a transmission signal via the transmission path 9 to a network. It is known that the image signal converted by the image signal output unit 5 is converted to an analog signal, a digital signal, or a compressed signal.

Figure 2:
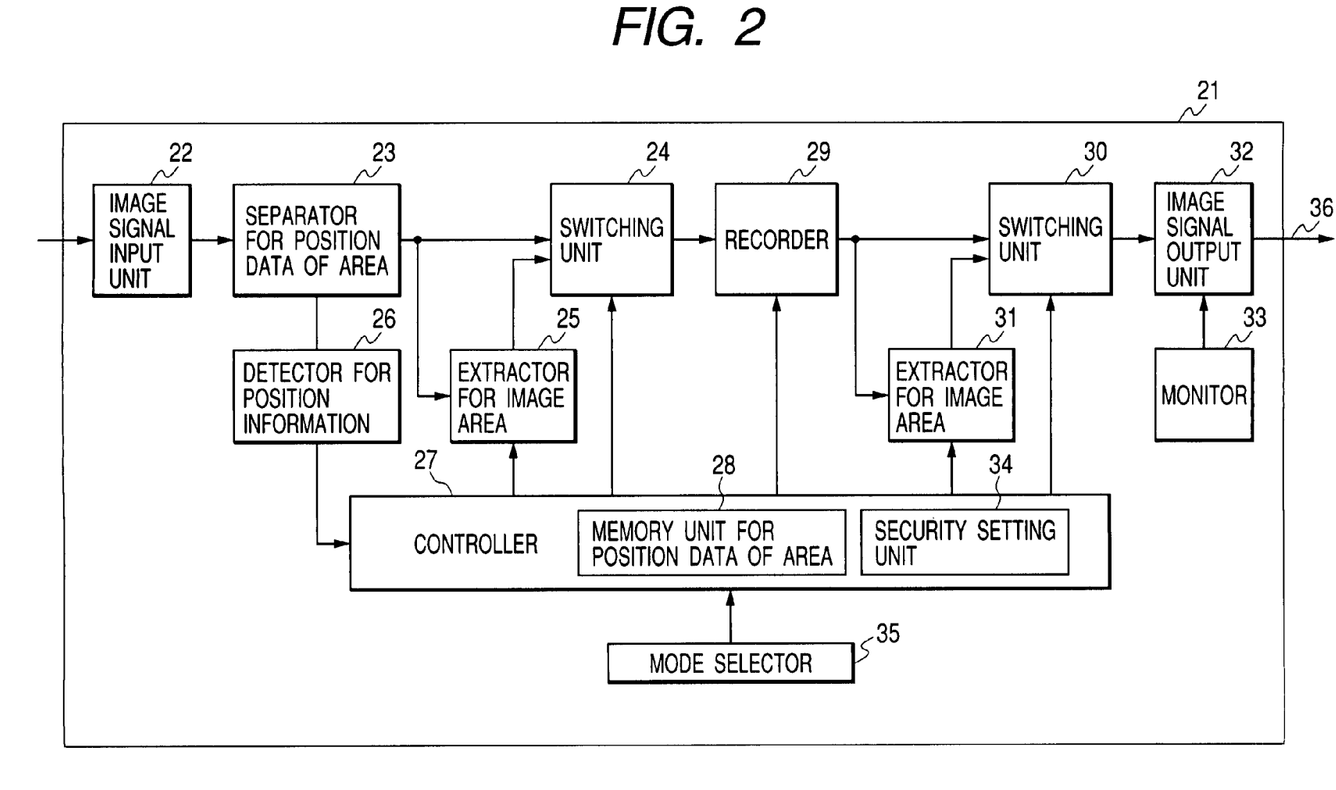
FIG. 2 is a block diagram showing an image signal reception apparatus of an embodiment according to the present invention.

FIG. 2 is a block diagram showing an embodiment of an image signal reception apparatus. An image signal transmitted from the image signal transmission apparatus 1 is inputted to an image signal input unit 22 of an image signal reception apparatus 21 shown in FIG. 2. The image signal input unit 22 performs necessary signal processing, which has been known, to the transmitted image signal, and then converts it to an analog image signal. The output is outputted to a separator 23 for position data of area. The image signal outputted from the image signal input unit 22 is the image signal on which the position information of the privacy-related image part P is superimposed by the position data adding unit 4 for area of the image signal transmission apparatus 1. The separator 23 for position data of area separates the position information of the privacy-related image part P, that is, (X1, X2) (Y1, Y2), from the transmitted image signal. The output of the separator 23 for position data of area is applied to a switching unit 24 and an extractor 25 for image area, respectively.

Figure 4:
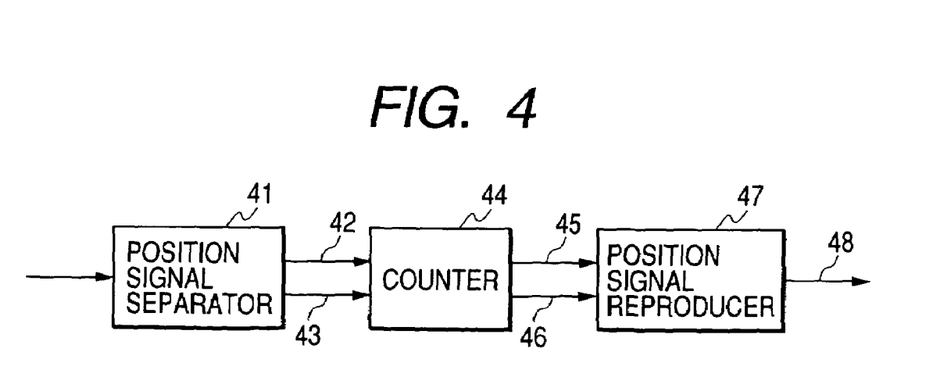
FIG. 4 is a block diagram showing an embodiment of a detector for position information according to the present invention.

The position information of the privacy-related image part P separated by the separator 23 for position data of area is applied to a detector 26 for position information. The detailed construction of the detector 26 for position information will be described using FIG. 4. The position information of the privacy-related image part P separated by the separator 23 for position data of area is applied to a position signal separator 41, and is then separated into a vertical blanking signal 42 and a horizontal blanking signal 43 to be inputted to a counter 44. The counter 44 extracts the 12th to 15th horizontal scanning periods of the vertical blanking period explained in FIG. 5, detects pulse positions subjected to binarization and superimposed in the horizontal blanking period shown in FIG. 6, detects an X pulse position 45 and a Y pulse position 46, and outputs them to a position signal reproducer 47. The position signal reproducer 47 reproduces the position information of the original privacy-related image part P, that is, (X1, X2) (Y1, Y2), from the X pulse position 45 and the Y pulse position 46. The position information is stored into a memory unit 28 for position data of area of a controller 27.

The switching unit 24 to which the analog image signal from the separator 23 for position data of area and the image signal from the extractor 25 for image area are applied, switches the necessary image signal based on the control of the controller 27 to record it into a recorder 29. The operation of the controller 27 will be described later. The extractor 25 for image area to which the analog image signal from the separator 23 for position data of area is applied, outputs an image signal resulting from the extraction of the privacy-related image part P from the analog image signal based on the position information of the privacy-related image part P outputted from the controller 27.

The recorder 29 records the image signal from the switching unit 24 based on the control of the controller 27 or reproduces the contents recorded, and then applies the reproduced image signal to a switching unit 30 and an extractor 31 for image area. The extractor 31 for image area is a circuit for extracting the privacy-related image part P from all the analog image signals recorded from the separator 23 for position data of area via the switching unit 24 into the recorder 29. As in the extractor 25 for image area, it outputs an image signal resulting from the extraction of the privacy-related image part P from all the analog image signals reproduced from the recorder 29 based on the position information of the privacy-related image part P outputted from the controller 27 to apply it to the switching unit 30. The switching unit 30 selects, based on the control of the controller 27, all the analog image signals from the recorder 29 or the signal from the extractor 31 for image area to display a surveillance image via an image signal output unit 32 on a monitor 33. When necessary, it is transmitted via a transmission path 36 to another reception apparatus.

The controller 27 is provided with a security setting unit 34. A mode selector 35 can suitably set the operation of the controller 27. The security setting unit 34 sets a special condition so that only a person who can see the privacy-related image part P, for example, a person who is legally authorized or is allowed to see it under the special condition, can see it.

The operation of the image signal reception apparatus 21 will be described based on the function of the controller 27. The image signal reception apparatus 21 is constructed to select three modes by mode selection of the mode selector 35. The three modes have the following functions.

mode 1: All images are recorded and reproduced into/from the recorder without masking.

mode 2: All images are recorded into the recorder without masking and a necessary range is masked in reproduction.

mode 3: An image signal is recorded with masking and is reproduced with masking.

The case of selecting the mode 1 will be described. When using the surveillance camera apparatus of the present invention in the location where the privacy-related image part P does not exist within the range picked-up by the camera unit 3, the privacy-related image part need not be set. Since masking is unnecessary for the screen displayed in such location, the mode 1 is selected for use. In this case, the controller 27 controls the switching units 24 and 30 to apply an image signal from the separator 23 for position data of area via the switching unit 24, the recorder 29 and the switching unit 30 to the image signal output unit 32.

The case of selecting the mode 2 will be described. When the privacy-related image part P exists within the range picked-up by the camera unit 3, position information of the privacy-related image part P is transmitted together with the image signal, as explained in FIG. 1. In the image signal reception apparatus 21, the position information of the privacy-related image part P is stored into the memory unit 28 for position data of area of the controller 27. The controller 27 controls the switching unit 24 to record all the analog image signals directly from the separator 23 for position data of area into the recorder 29 or to record an image signal masking the privacy-related image part P from the extractor 25 for image area. When recording all the analog image signals, the switching unit 30 switches, based on the control of the controller 27, whether all the analog image signals are reproduced as reproduction signals or the image signal masking the privacy-related image part P is outputted from the extractor 31 for image area, for display on the monitor or transmission to the outside. When using the mode 2, the privacy-related information can be freely seen or masked. In this case, high-degree security protection of the security setting unit 34 is set. Needless to say, the privacy-related information can be seen only under legal authorization or the special condition.

The case of selecting the mode 3 will be described. When the privacy-related image part P exists within the range picked-up by the camera unit 3, the switching unit 24 is controlled based on the control of the controller 27 to record, into the recorder 29, an image signal masking the privacy-related image part P by the extractor 25 for image area for reproducing it in the masked state.

As described above, in the present invention, regardless of the existence or inexistence of the privacy-related image part P, all the analog image signals are transmitted to the image signal reception apparatus 21. The image signal reception apparatus 21, as explained about the modes 1, 2 and 3, can reproduce a necessary image by the operation of the mode selector 35. For reproduction or transmission of privacy-related image information, setting of the security setting unit 34 can set the special condition such that only a person who is allowed to see it under the special condition. It can be realized as a very safe surveillance apparatus. The surveillance camera apparatus of the present invention can be used for application of various surveillance cameras and can select a use condition by mode selection.

The present invention is described above in detail. The present invention is not limited to the embodiment of the surveillance apparatus described herein. Needless to say, the present invention can be applied widely to an apparatus or a detection method for detecting the change in the field of view of an imaging unit.

As described above in detail, the present invention is a surveillance camera apparatus which can protect privacy-related information. It can be constructed such that all image information is transmitted so as to see privacy-related information only under legal authorization or under the special condition, whereby it can be suitably selected and seen in a receiving side. In addition, the present invention is a surveillance camera apparatus which can mask information which is not allowed to see and can realize a surveillance camera apparatus which can be used for many purposes.

It will be appreciated while particular embodiments of the invention have been shown and described, modifications may be made. It is intended in the claims to cover all modifications which come within the true spirit and scope of the invention.

What is claimed is:

1. A surveillance camera apparatus comprises an image signal transmission apparatus transmitting an image signal and an image signal reception apparatus, coupled with said image signal transmission apparatus through a transmission path, for receiving said image signal from said image signal transmission apparatus, wherein said image signal transmission apparatus comprises:

an image pick-up unit for picking-up an object and outputting an image signal of said object;

a position input unit for generating position information relating to a predetermined privacy-related image part;

a position data adding unit, coupled with said image pick-up unit, for superimposing said position information into a vertical blanking period of said image signal from said image pick-up unit; and a first image signal output unit, coupled with said position data adding unit, for outputting said image signal with said position information obtained from said position input unit, said image signal being all image signals including an image signal of said predetermined privacy-related image part and said image signal of said object, wherein said all image signals are transmitted to said image signal reception apparatus through a transmission path, and wherein said image signal reception apparatus comprises:

an image signal input unit for applying said all image signals with said position information from said image signal transmission apparatus;

a position information detector for detecting said position information from said all image signals;

a recorder for recording said all image signals without masking or with masking based on said position information;

a second signal output unit, coupled with said recorder, for outputting said all image signals without masking or with masking from said recorder; and a controller for selectively outputting from said image signal output unit, one of said all image signals without masking and said all image signals with masking said predetermined privacy-related image part based on said position information from said position information detector.

2. A surveillance camera apparatus according to claim 1, wherein said image signal reception apparatus further comprising:
a mode selector, and said controller selects at least one of a mode recording said all image signals without masking into said recorder and a mode recording said image signal with masking into said recorder based on a selection signal from said mode selector.

3. A surveillance camera apparatus according to claim 2, wherein said controller further comprising:
a security setting unit, and said mode recording said all image signals without masking into said recorder is set by a signal of said security setting unit.

4. A surveillance camera apparatus according to claim 1, wherein said image signal reception apparatus further comprising:
a first selector for selectively recording into said recorder one of said all image signals without masking and said all image signals with masking a predetermined privacy-related image part from said image signal based on said position information, and
a second selector for selectively outputting from said recorder said all image signals without masking and said all image signals with masking said predetermined privacy-related image part from said image signal based on said position information.

5. An image signal transmission apparatus for transmitting an image signal through a transmission path, comprising:
an image pick-up unit for picking-up an object and outputting an image signal of said object;
a position input unit for generating position information relating to a predetermined privacy-related image part;
a position data adding unit, coupled with said image pick-up unit, for superimposing said position information obtained from said position input unit into a vertical blanking period of said image signal obtained from said image pick-up unit; and
a first image signal output unit, coupled with said position data adding unit, for outputting said image signal from said image pickup unit, said image signal being all image signals including an image signal of said predetermined privacy-related image part and said image signal of said object, to which said position information is added,
wherein said all image signals are output though said transmission path.

6. An image signal reception apparatus comprising:
an image signal input unit for inputting an image signal to which position information related to a predetermined privacy-related image part is added, said image signal being all image signals including an image signal of said predetermined privacy-related image part and an image signal of an object from an image signal transmitting apparatus, said position information having been superimposed into a vertical blanking period of said image of said object;
a position information detector for detecting said position information from said image signal;
a recorder for recording said image signal without masking or with masking based on said position information;
a second image signal outputting unit, coupled with said recorder, for outputting said all image signals without masking or with masking from said recorder; and
a controller for selectively outputting from said image signal output unit, one of said all image signals without masking and said all image signals with masking said predetermined privacy-related image part based on said position information from said position information detector.

7. An image signal reception apparatus according to claim 6, further comprising:
a mode selector, and said controller selects at least one of a mode recording said all image signals without masking into said recorder and a mode recording said all image signals with masking into said recorder based on a selection signal from said mode selector.

8. An image signal reception apparatus according to claim 7, wherein said controller further comprising:
a security setting unit, and said mode recording said all image signals without masking into said recorder is set by a signal of said security setting unit.

9. An image signal reception apparatus according to claim 6, further comprising:
a first selector for selectively recording into said recorder one of said all image signals without masking and said all image signals with masking a predetermined privacy-related image part from said image signal based on said position information; and
a second selector for outputting from said recorder one of said image signal without masking and said all image signals with masking a predetermined privacy-related all image part from said image signals based on said position information.

* * * * *